(12) United States Patent
Wu et al.

(10) Patent No.: US 11,605,228 B2
(45) Date of Patent: Mar. 14, 2023

(54) SYSTEM AND METHOD FOR SENSOR FUSION SYSTEM HAVING DISTRIBUTED CONVOLUTIONAL NEURAL NETWORK

(71) Applicant: NXP USA, Inc., Austin, TX (US)

(72) Inventors: Ryan Haoyun Wu, San Jose, CA (US); Satish Ravindran, Sunnyvale, CA (US); Adam Fuks, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 368 days.

(21) Appl. No.: 16/913,930

(22) Filed: Jun. 26, 2020

(65) Prior Publication Data

US 2021/0406674 A1 Dec. 30, 2021

(51) Int. Cl.
| | |
|---|---|
| G06V 20/50 | (2022.01) |
| G06N 3/04 | (2023.01) |
| G06N 3/08 | (2023.01) |
| G06V 10/82 | (2022.01) |
| G05D 1/02 | (2020.01) |

(52) U.S. Cl.
CPC ............... *G06V 20/50* (2022.01); *G06N 3/04* (2013.01); *G06N 3/08* (2013.01); *G06V 10/82* (2022.01); *G05D 1/0231* (2013.01); *G05D 1/0257* (2013.01)

(58) Field of Classification Search
None
See application file for complete search history.

(56) References Cited

U.S. PATENT DOCUMENTS

| 6,862,537 B2 | 3/2005 | Skrbina et al. |
| 7,005,981 B1 | 2/2006 | Wade |
| 9,097,800 B1 | 8/2015 | Zhu |

(Continued)

FOREIGN PATENT DOCUMENTS

| CN | 105095896 A | 11/2015 |
| JP | 4906753 B2 | 3/2012 |
| WO | 2020/049154 A1 | 3/2020 |

OTHER PUBLICATIONS

Jason Ku et al., "Joint 3D Proposal Generation and Object Detection from View Aggregation," Int'l Conf on Intelligent Robots and Systems, arXiv:1712.02294v4 (Jul. 12, 2018).

(Continued)

*Primary Examiner* — Leon Flores

(57) ABSTRACT

An early fusion network is provided that reduces network load and enables easier design of specialized ASIC edge processors through performing a portion of convolutional neural network layers at distributed edge and data-network processors prior to transmitting data to a centralized processor for fully-connected/deconvolutional neural networking processing. Embodiments can provide convolution and downsampling layer processing in association with the digital signal processors associated with edge sensors. Once the raw data is reduced to smaller feature maps through the convolution-downsampling process, this reduced data is transmitted to a central processor for further processing such as regression, classification, and segmentation, along with feature combination of the data from the sensors. In some embodiments, feature combination can be distributed to gateway or switch nodes closer to the edge sensors, thereby further reducing the data transferred to the central node and reducing the amount of computation performed there.

13 Claims, 10 Drawing Sheets

(56) References Cited

U.S. PATENT DOCUMENTS

| | | | |
|---|---|---|---|
| 9,697,606 | B2 | 7/2017 | Stout et al. |
| 9,710,714 | B2 | 7/2017 | Chen et al. |
| 9,915,950 | B2 | 3/2018 | Hartung et al. |
| 10,401,490 | B2 | 9/2019 | Gillian et al. |
| 10,762,440 | B1 * | 9/2020 | Garg ..................... G01S 13/867 |
| 2003/0179084 | A1 | 9/2003 | Skrbina et al. |
| 2013/0222127 | A1 | 8/2013 | Ray Avalani |
| 2017/0097413 | A1 | 4/2017 | Gillian et al. |
| 2018/0322386 | A1 | 11/2018 | Sridharan et al. |
| 2018/0322387 | A1 | 11/2018 | Sridharan et al. |
| 2018/0322606 | A1 | 11/2018 | Das et al. |
| 2018/0359378 | A1 | 12/2018 | Huang et al. |
| 2019/0258251 | A1 | 8/2019 | Ditty et al. |
| 2020/0301013 | A1 * | 9/2020 | Banerjee ............... G01S 13/867 |

OTHER PUBLICATIONS

Zining Wang et al., "Fusing Bird's Eye View LIDAR Point Cloud and Front View Camera Image for Deep Object Detection," Intelligent Vehicle Symposium, arXiv:1711.06703v3 (Feb. 14, 2018).

Gledson Melotti et al., "CNN-LIDAR pedestrian classification: combining range and reflectance data," IEEE Int'l Conf of Vehicular Electronics and Safety (2018).

Kaiming He et al., "Mask R-CNN," Int'l Conf on Computer Vision, arXiv:1703.06870v3 (Jan. 24, 2018).

Kanil Patel et al., "Deep Learning-based Object Classification on Automotive Radar Spectra," IEEE Radar Conf (2019).

Andras Pfeuffer et al., "Optimal Sensor Data Fusion Architecture for Object Detection in Adverse Weather Conditions," 21st Int'l Conf on Information Fusion (2018).

* cited by examiner

SYSTEM AND METHOD FOR SENSOR FUSION SYSTEM HAVING DISTRIBUTED CONVOLUTIONAL NEURAL NETWORK

BACKGROUND

Field

This disclosure relates generally to automotive sensor systems, and more specifically, to a sensor fusion system incorporating a distributed convolutional neural network.

Related Art

Autonomous driving and robotic systems rely on multimodal sensors to provide information regarding the surrounding environment to make safe decisions on movement. The information regarding the surrounding environment can be generated by a perception system that fuses all sensor data to produce a single common perception environment for operation.

Perception processing can be performed using convolutional neural network (CNN) machine learning approaches. In such an approach, a single or multiple neural network is trained to process sensory data for various tasks such as detecting and classifying objects and segmenting pixels, voxels, or points reported by sensors into individual groups with respect to classification types or identities.

Today, the primary neural network design that fuses raw data generated by multi-modal (e.g., radar, lidar, and camera), multi-view, multi-sensor architectures is referred to as an early fusion network. Early fusion networks operate on primitive data, which contrasts with late fusion networks in which a fusion processor takes already detected and classified objects and combines the information. Early fusion networks generally have superior fused detection and accuracy performance because decisions are made based on more abundant and diverse data points versus late fusion networks in which individual neural nets can make ill-informed decisions.

But early fusion networks can have some issues, including, for example, use of a single neural network that takes inputs from all sensors requires a large memory and high processing throughput, large amounts of raw sensory data communicated from the sensors to the centralized processor, a central processing platform that is based on a general-purpose processor can be less efficient than a specialized processor, complex programming models, and less efficient use of edge processing at the sensor nodes. It is therefore desirable to have a fusion network that has advantages of the early fusion processing but with efficient use of the network, processing resources, and memory.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Figure 1:
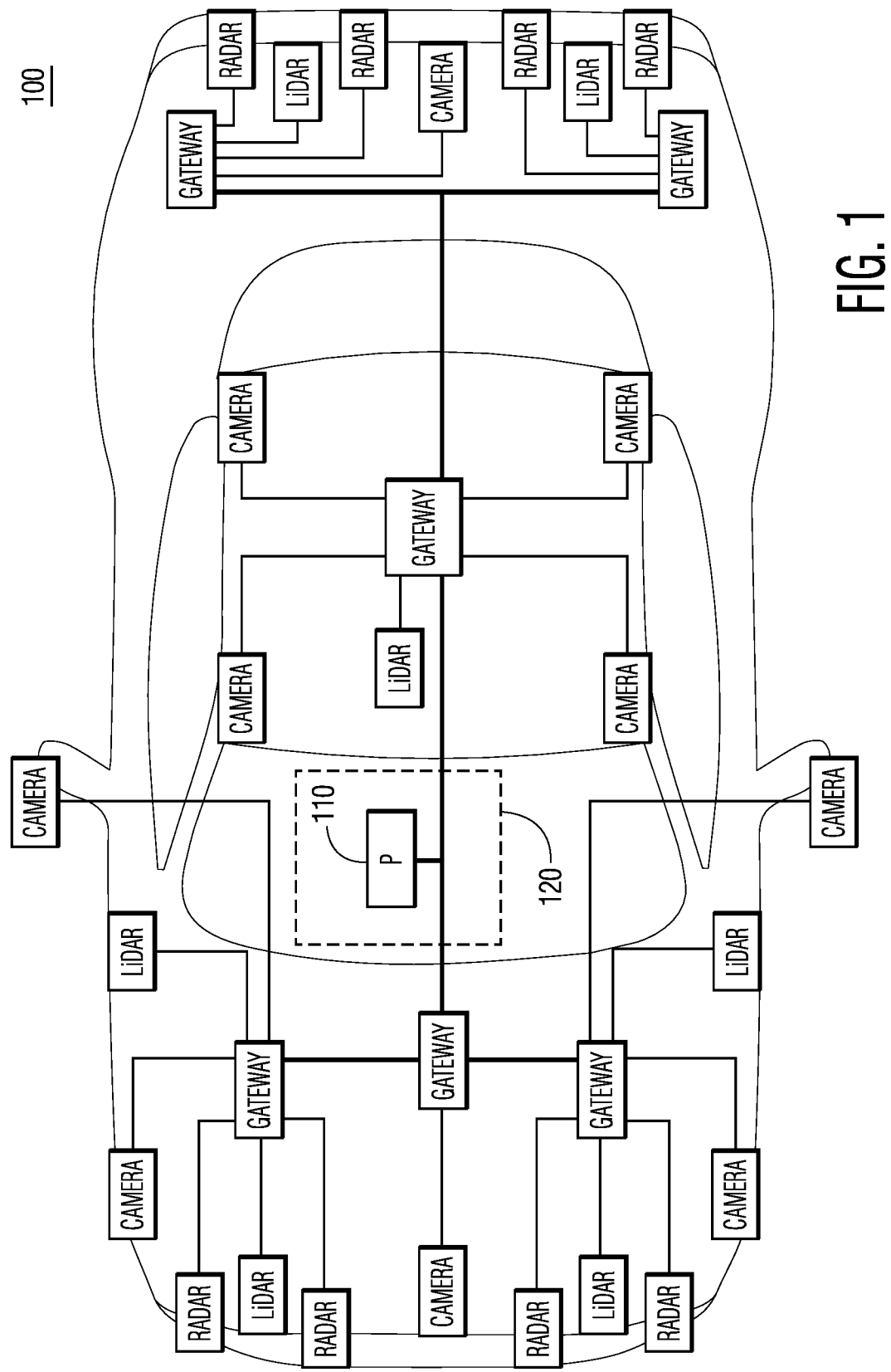
FIG. 1 is a simplified block diagram illustrating an example of a sensor network used in an automobile.

Embodiments of the present invention provide an early fusion network that reduces network load through performing a portion of convolutional neural network layers at distributed edge and data-network processors prior to transmitting data to a centralized processor for fully-connected/deconvolutional neural networking processing. Embodiments provide convolution and downsampling layer processing (e.g., pooling) in association with the digital signal processors associated with edge sensors of, for example, an automobile, including camera sensors, radar sensors, and lidar sensors. Once the raw data is reduced to smaller feature maps through the convolution-downsampling process, this reduced data is transmitted to a central processor for fully connected layer/deconvolution layer processing such as regression, classification, and segmentation, along with feature combination of the data from the sensors. In some embodiments, feature combination can be distributed to gateway or switch nodes closer to the edge sensors, thereby further reducing the data transferred to the central node and reducing the amount of computation performed there. Embodiments enhance efficiency of these tasks by providing a specialized processor or accelerator (e.g., ASICs) to perform the machine learning associated tasks at the edge nodes and also reduce the amount of data transferred in the network.

Embodiments of the present invention resolve issues associated with current early fusion systems while retaining the benefits from a raw-data early fusion system. Certain embodiments achieve low cost, size, weight, and power for the overall system by using distributed edge Convolutional Neural Net (CNN) processors, as opposed to a centralized a general-purpose processor. By distributing preprocessing operations and inferencing operations in the neural network across the edge devices (e.g., preprocessing, convolutions, and downsampling/stride convolution), intermediate smart networking devices (e.g., feature combining, and the central computing platform (e.g., fully connected layers of the neural network and the convolution) simple ASICs can be used that are optimized for the various operations. In some embodiments, the intermediate nodes of a smart gateway can use a general-purpose CPU designed to cover a wide variety of feature combining techniques, rather than a specialized purpose ASIC.

Embodiments can also provide improved scalability through the partitioning of common feature extraction layers useful to the various sensor modalities and use cases from the more versatile later layers that perform regression, classification, and segmentation. Through implementing the preprocessing and feature extraction tasks (e.g. initial layers of convolutional neural networking) on edge SOC's in a distributed fashion, utilizing the intermediate smart networking switch/gateway processors as smart feature combiners, and then providing the fusion networks on the central processor, the whole system becomes modular and can be used with multiple configurations of sensors. If there are fewer sensors, there is an effective decrease in the compute and memory footprint of the entire system. On the other hand, the more sensors being utilized, then there is a corresponding increase in compute and memory capacity.

Common feature extraction layers on the edge devices are trained in a manner that the extracted features are used by multiple neural nets in the central processor. This differs from conventional neural network setups where each neural net has individual architecture and trained feature extraction layers.

Further, by processing raw sensor data at the edge prior to providing that data to a central processor, there is a reduction in the quantity of data transported through the network connecting the sensors and the central processor. This can enable the use of lower bandwidth, and hence less expensive, lower latency, and lower power consuming networking resources.

FIG. 1 is a simplified block diagram illustrating an example of a sensor network used in an automobile 100. In an autonomous driving system, for example, data from multiple different types of sensors is used to construct a 360° perception of the environment around the vehicle. Typical sensor types include radar, camera, LiDAR, ultrasound, and a GPS/inertial measurement unit. FIG. 1 illustrates a simplified example of distribution of such sensors throughout the vehicle.

Multiple radar sensors can be deployed along the front and rear of the vehicle. Radar sensors send out radio waves that detect objects and gauge their distance, angle, and speed in relation to the vehicle in real time. Both short- and long-range radar sensors can be deployed around the car. Short range (24 GHz) radar applications can be used for blind spot monitoring, laying-keeping assistance, and parking aids. Long range (77 GHz) radar sensors include automatic distance control and break assistance. In addition, newer imaging radar sensors can map out surroundings in a three-dimensional point cloud in high resolution. Each point in the point cloud is augmented with sensory information such as radial velocity, radar cross section, and polarization.

LiDAR (light detection and ranging) sensors work similar to radar sensors but use laser light instead of radio waves. In addition to measuring distances to various objects around the vehicle, lidar allows creating 3D images of detected objects and mapping the surroundings. LiDAR can be configured to create a full 360° map around the vehicle rather than relying on a narrow field of view. Newer frequency-modulated continuous-wave LiDAR sensors can also augment point objects with radial velocity information.

Vehicles also have video cameras and visual sensors used to see and interpret objects around the vehicle in a manner similar to how human drivers see with their eyes. A vehicle can be equipped with camera sensors at every angle to maintain a 360° view of the environment around the vehicle, which provides a broader picture of traffic conditions. Three-dimensional cameras are available and can be utilized to automatically detect objects, classify the objects, and determine distances between the objects and the vehicle.

As illustrated in FIG. 1, the various sensors are placed around the vehicle and provide network connections to several gateway nodes. The gateway nodes can be smart switches that gather the data from the various sensors and provide that information to a central processor 110. As will be discussed more fully below, in current vehicles, central processor 110 can be configured to perform neural networking tasks to identify objects around the vehicle and to thereby aid in the decision-making process for avoidance or otherwise responding to those objects. Conversely, embodiments of the present invention seek to move some of the computational effort associated with object identification away from central processor 110 and into one or both of edge sensors (e.g., radar, LiDAR, and camera) and gateway nodes.

Embodiments provide a distributed early sensor fusion system in which raw multi-modal sensory data including, but not limited to, radar point cloud or detection clusters, camera image pixel maps, and a lidar point clouds are processed by a fusion neural network to produce surrounding-view perception information for assisting decision-making processing in autonomous driving or robotic systems. The perception information can include, for example, object boundary detection and classification and semantic and instance segmentation.

Embodiments can provide pre-processors and feature extraction processing located on individual sensors. The outputs from the sensors are then transported via data communication links to an intermediate smart gateway/network switch node which can partition the data and further intelligently combine the data according to the application associated with that data. The output from that processing (e.g., and augmented and recombined feature map) is transported over the network to a centralized compute platform for further analysis (e.g., fusion classification/regression/segmentation neural networking layers).

As an example of the distributed processing of embodiments, a preprocessor can project the lidar data to different views with each view processed by a different convolutional neural network (CNN). Each feature map extracted can then be transported over the network to a network gateway that can intelligently combine different feature maps from different edge nodes (e.g. for a fusion network which utilizes lidar and cameras for object detection, lidar features with a common field of view to a particular camera can be cropped and concatenated or appended to the camera information). Once the intelligent combination is performed at the gateway node, the combined information can be sent over the network to the central compute processor for further fusion processing.

Autonomous driving perception, including bounding box detections, classification, semantic segmentation, and instance segmentation, relies on individual deep neural nets that consume primitive sensory data and then the individual outputs are fused at an object level for decision-making. This is known as late fusion. Alternatively, an early fusion system can improve reliability by employing a single large neural network that consumes primitive sensor data and outputs a joint perception result. A typical sensor primitive can include, for example, detection/peak clusters for radar, image pixel maps for cameras, and 3D point clouds for lidar. In both early and late fusion, neural networking processing is implemented in a central location out of convenience.

Figure 2:
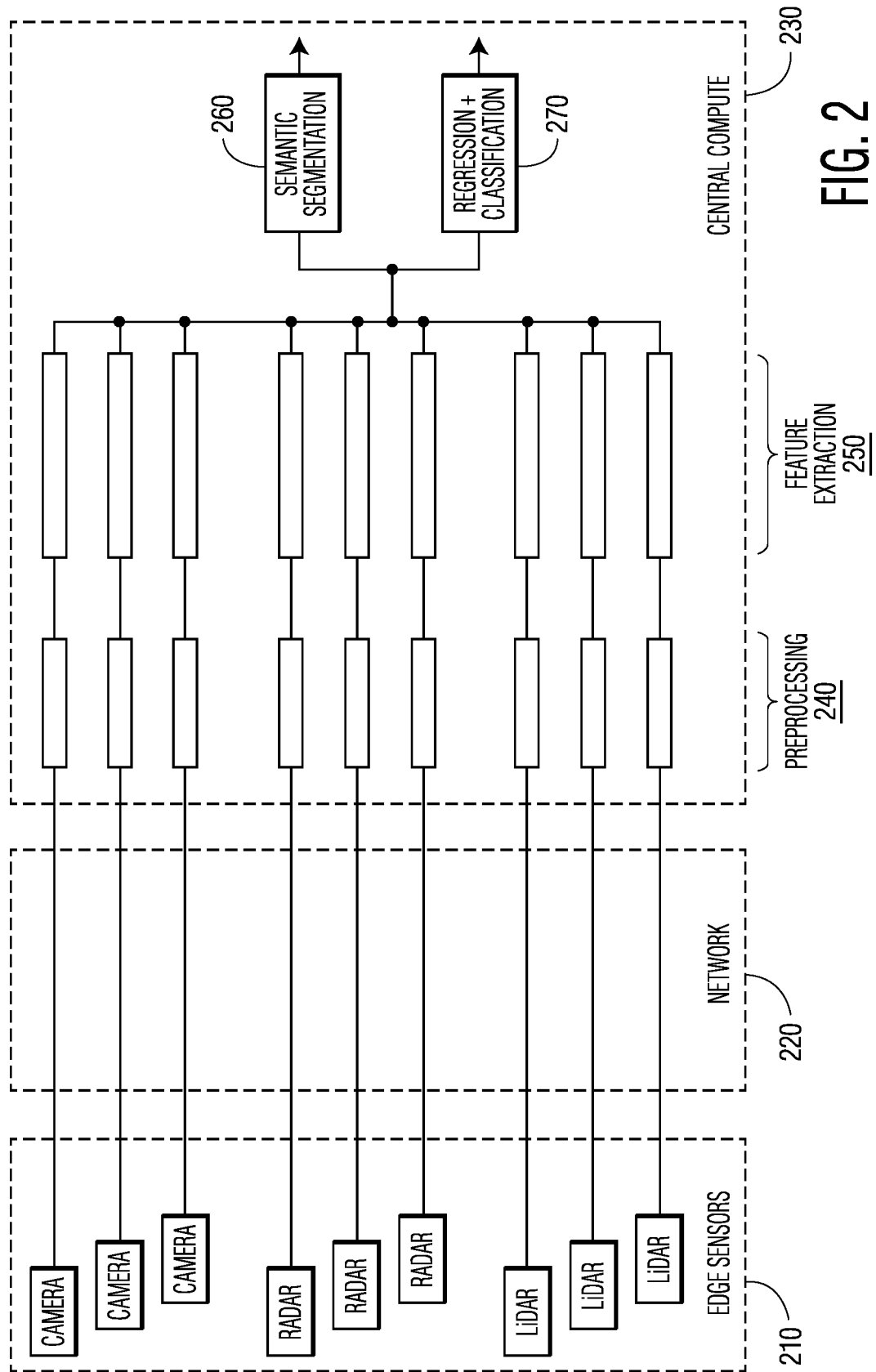
FIG. 2 is a simplified block diagram illustrating a current system architecture utilized for early fusion systems.

FIG. 2 is a simplified block diagram illustrating a current system architecture utilized for early fusion systems. Targets around the vehicle can be detected by edge sensors 210 and the raw data from the edge sensors is sent directly over a network 220 to a central compute node 230. The central compute node then performs a variety of operations associated with CNN including, as illustrated, preprocessing 240, feature extraction 250, semantic segmentation 260, and regression and classification 270. To perform these tasks, the central compute node can include a variety of accelerators and general-purpose processors. The central compute node also requires a significant amount of memory to aggregate all the raw data from the entire sensor suite. This can result in a complicated central compute platform with a complicated programming model that can make it difficult to utilize. Further, communication of the raw data from the edge sensors to the central compute node can require high-bandwidth network links that consume a significant amount of power. In addition, the supporting hardware is typically more delicate hardware, more expensive, and sensitive to the harsh automotive environment.

Figure 3:
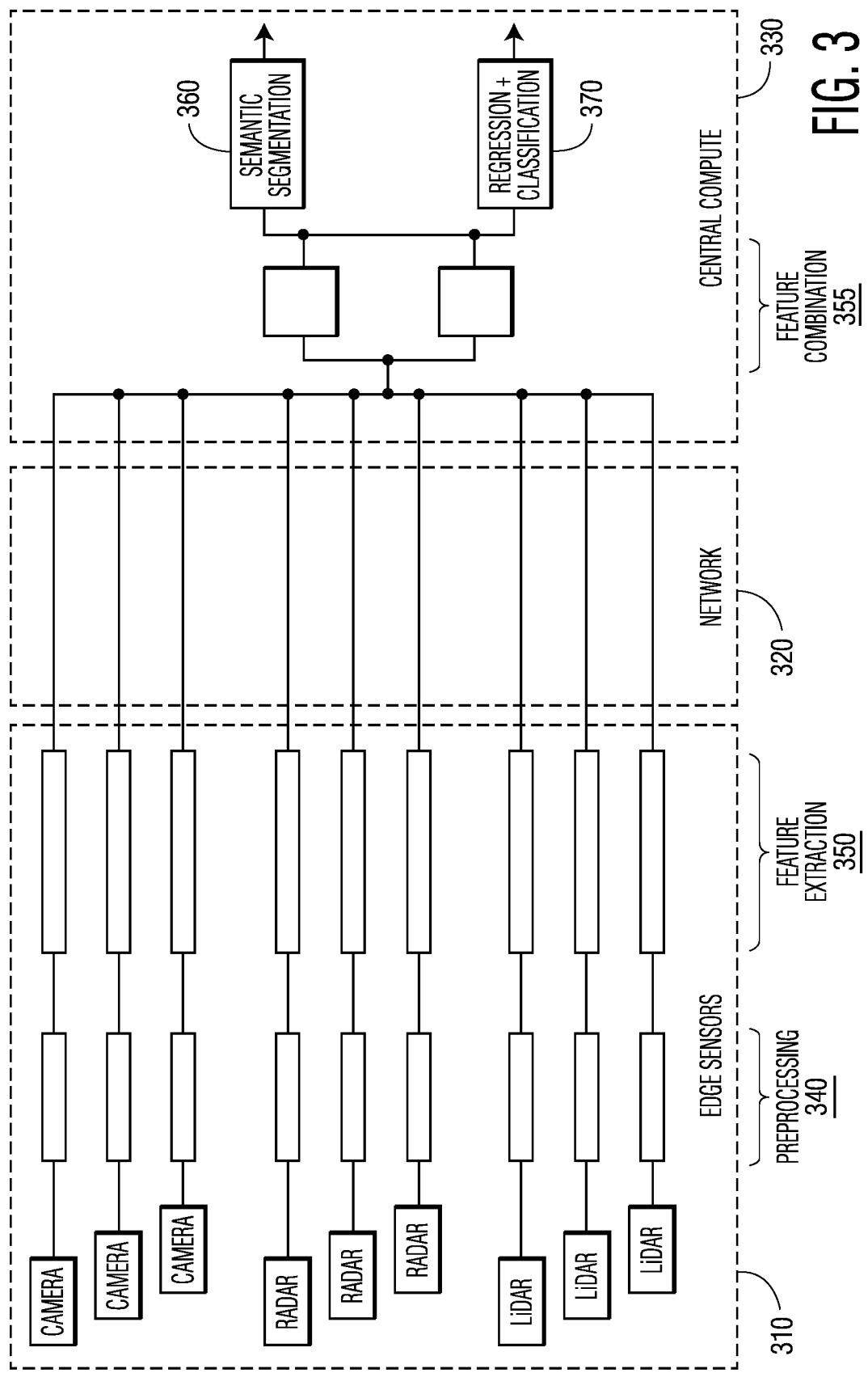
FIG. 3 is a simplified block diagram illustrating an example of a system architecture for performing distributed early fusion sensor processing, in accord with an embodiment of the present invention.

FIG. 3 is a simplified block diagram illustrating an example of a system architecture for performing distributed early fusion sensor processing, in accord with an embodiment of the present invention. Instead of transporting the raw sensory data through the vehicular network, an output feature map of convolutional layers in the extracted feature space is produced at the edge and then transmitted to the central processor through the network. In order to perform these tasks, vision, radar, and LiDAR processing chipsets can include feature extraction processing, such as special purpose ASICs and the like.

FIG. 3 illustrates an example of such a distributed architecture. Edge sensors 310 provide for preprocessing 340 and feature extraction 350 processing. Subsequent to feature extraction, the extracted data is provided over network 320 to central compute server 330. Once the data arrives at central compute server 330, feature combination tasks 355 are performed to associate and combine the various data from the sensors. Then semantic segmentation 360 and regression and classification 370 processing can be performed.

Some benefits of such distributed early fusion processing include, for example, leveraging very low cost, size, weight, and power hardware compared to a central processor-based solution; utilizing relatively stable and common feature extraction layers (e.g. convolution layers of a CNN) for each type of sensor and use cases that allows for cost optimization for OEMs and can speed up SOC development cycles; focusing the central compute processor on the later fusion layers of the neural network, which allows for the use of highly specialized ASICs designed to optimize those operations; and mitigation of prohibitively high data bandwidth requirements in the network.

The high-level system architecture illustrated in FIG. 3 includes multiple edge sensor modules (310), where each module houses a sensor and an SOC that can preprocess the data (340) from the sensor using a variety of algorithms to project the data onto a space that can be input to a CNN feature extractor (350) (e.g., generating a camera image pixel map, generating a projected/pixel lysed radar/lidar point cloud, and generating a set of voxelized radar/lidar detections). Each sensor module can provide multiple CNNs 350 for extracting different feature sets for a variety of applications. The features extracted from each feature extraction layer 350 are transported over network 320 to central compute server 330. At the central compute server, a feature combiner 355 intelligently combines the features coming in over the network into a format suitable for the fusion neural network layers (e.g. 360 and 370). The feature combiner determines how and which features should be combined based on various characteristics such as field of view overlap, spatial correlation, sensor modality, and the like. The fusion layers use the aggregated feature map to make decisions for bounding box regression, classification and semantic/instance segmentation. In the illustrated distributed fusion architecture, the preprocessing function of the centralized fusion neural network is broken into two parts with the feature combining function residing in the central processor.

As discussed above, one of the benefits of the distributed feature extraction process provided by embodiments of the present invention is a reduction in data bandwidth requirements of the network. For example, a 1280×480×3 vision sensor having 8 bits per pixel will generate an image having 1.75 MB per frame. If the vision sensor includes a chipset providing the preprocessing and feature extraction of the present invention, the extracted feature space transmitted across the network can be on the order of 300 kB per frame (e.g., 40×15×256 by 16 bits), or about 17% the raw data size. As another example, for a radar raw data cube there can be 64 MB raw data per frame (e.g., 512(range)×256(doppler)×128(angle)×32(bits per element)). Preprocessing and feature extraction at the edge sensor can reduce the data transmitted over the network to about 1 MB per frame (1.5% the raw data size). Lidar provides different types of input specification and the feature extraction process can provide differing data bandwidth benefits. In a first input specification example, LiDAR generates 640 kB per frame (64(vertical channels)×512(horizontal points)×5(feature channels)×32 (bits per element)) that is reduced to 120 kB per frame after feature extraction (4×16×512×32) (18.75%). In a second input specification example, LiDAR generates 7.32 MB per frame (400(vertical points)×1200(horizontal points)×4(feature channels)×32(bits per element)), that is reduced to 2 MB per frame (16×64×512×32) (27.3%). In a third example, a LiDAR Birds Eye View frame can be about 10 MB per frame that is reduced to 1 MB per frame (10%).

Figure 4:
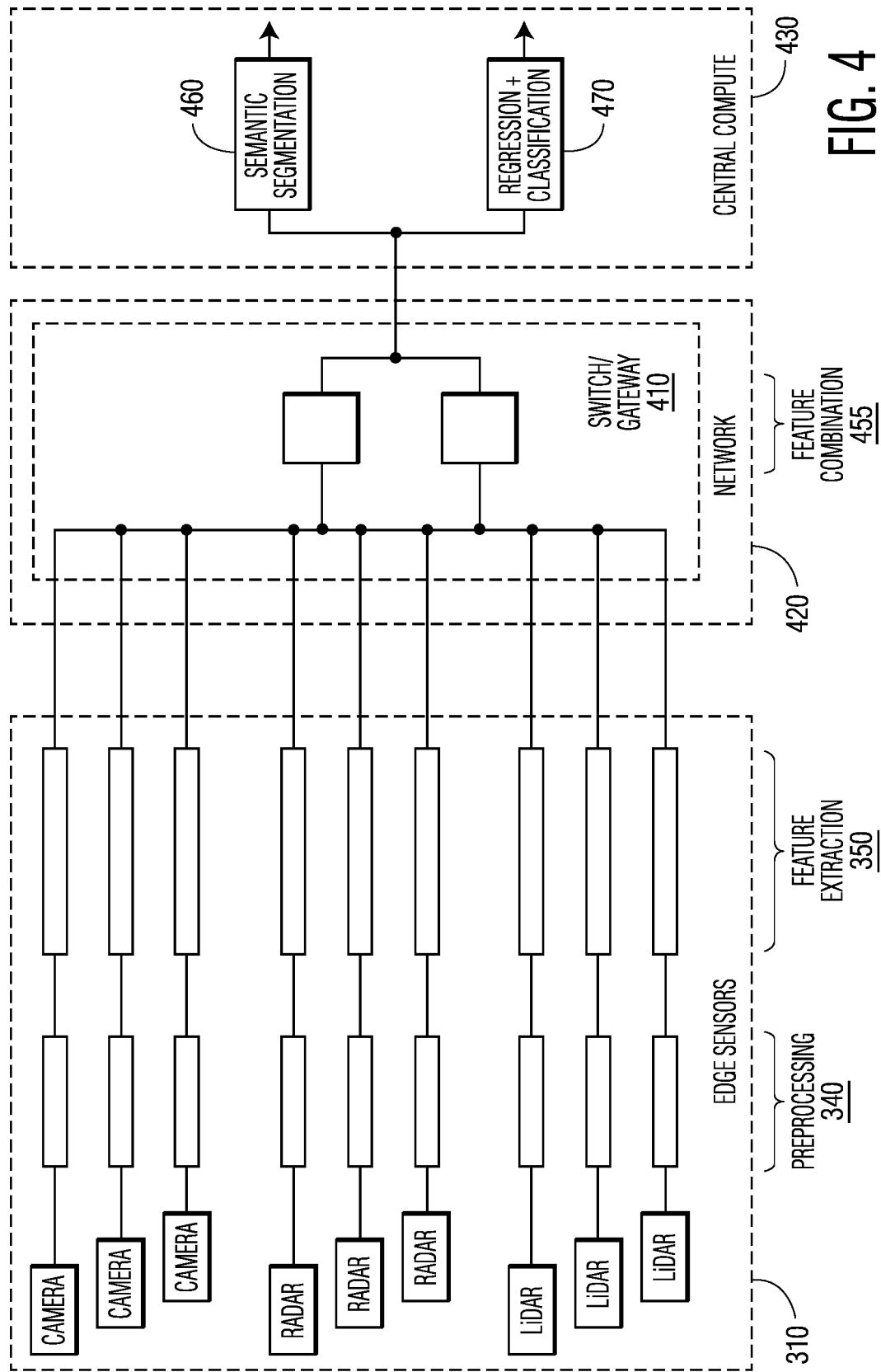
FIG. 4 is a simplified block diagram illustrating an alternative example of a system architecture for performing distributed early fusion center processing, in accord with an embodiment of the present invention.

FIG. 4 is a simplified block diagram illustrating an alternative example of a system architecture for performing distributed early fusion center processing, in accord with an embodiment of the present invention. As with the system architecture illustrated in FIG. 3, an output feature map of convolutional layers in the extracted feature space is produced at the edge. In addition, intermediate processing provided at network gateways performs feature combination prior to transmitting the data to the central processor over the network.

As with FIG. 3, edge sensors 310 provide for preprocessing 340 and feature extraction 350 processing. Subsequent to feature extraction, the extracted data is provided to a gateway 410 at the edge of network 420. Gateway device 410 provides processing capacity to perform the feature combination tasks that were illustrated in central compute 330 of FIG. 3. Functionally, feature combination is not part of the fusion neural network architecture and, therefore, feature combination can be moved to gateway device 410 to combine the features provided by the sensors communicating with that gateway device prior to transporting the information over the network 420 to central compute 430. Feature combination can also be performed with a general purpose processor to make decisions about those features that should be combined based on the application, rather than using the special purpose processors associated with the segmentation 460 and regression/classification 470 layers of the neural network. By performing the feature combination at the edge, processing at the central compute server 430 is focused on the fully connected layers and deconvolutional layers of the neural network, simplifying the hardware and programming. Further, the general-purpose computing of the feature combiner at the gateway node allows for diverse computing needs to be met at the gateway.

Figure 5A:
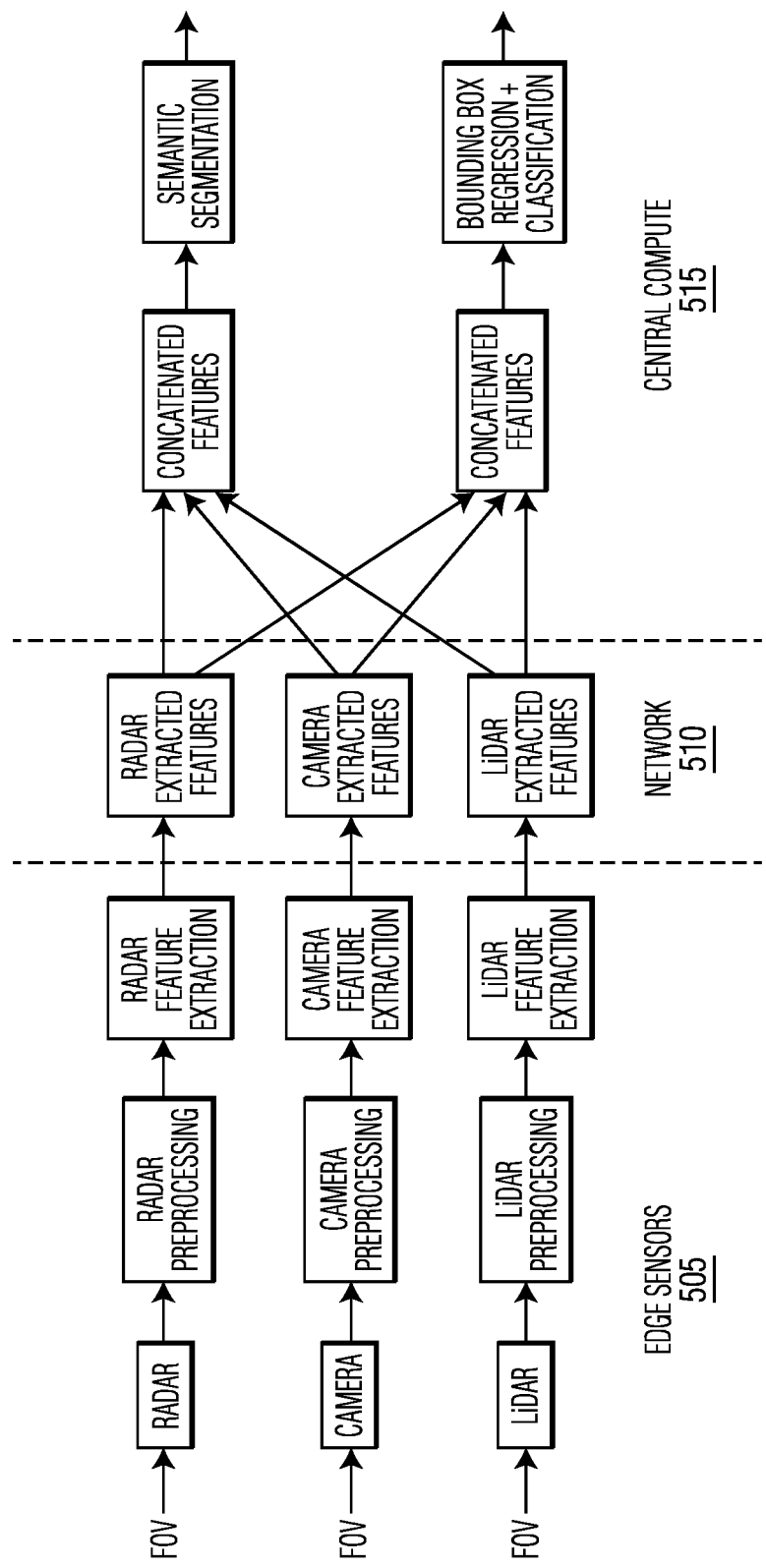
FIGS. 5A-5D are simplified block diagrams illustrating configuration examples of distributed sensor fusion architectures incorporating embodiments of the present invention.

FIGS. 5A-5D are simplified block diagrams illustrating configuration examples of distributed sensor fusion architectures incorporating embodiments of the present invention. FIG. 5A illustrates a sensor fusion system architecture having multi-modal sensors (R=radar, C=camera, L=LiDAR) each having a same field of view. Edge sensors 505 can include preprocessors and specialized ASICs optimized to accelerate convolutional layers of a CNN to extract the raw data features to a same field of view. The extracted features are then transported over network 510 to central compute server 515. The central compute server then concatenates the extracted features depth wise, since they are already spatially correlated during the preprocessing and feature extraction stage. The concatenated features are then passed to additional fusion neural networks for semantic segmentation or bounding box regression and classification.

Figure 5B:
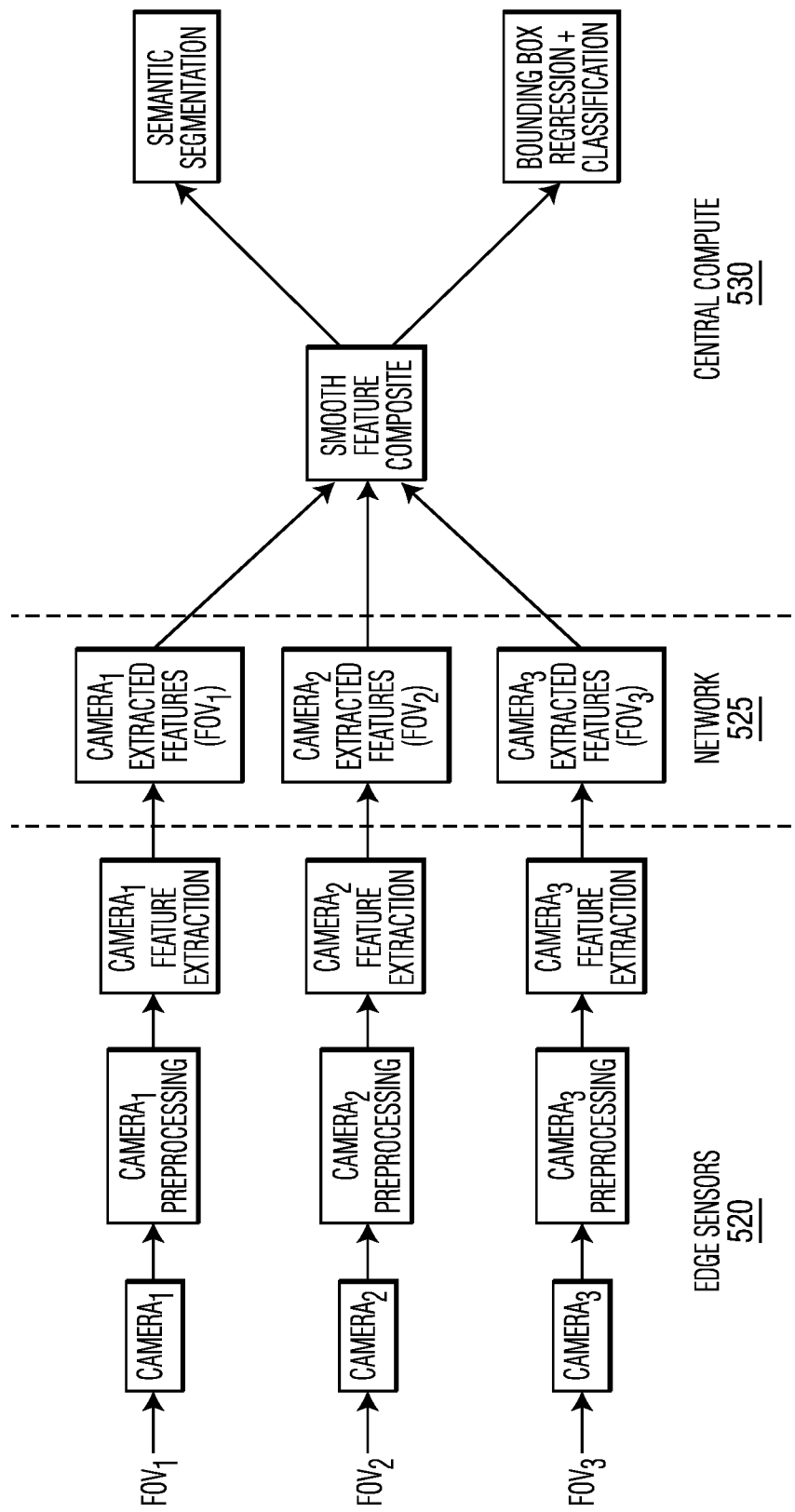

FIG. 5B illustrates a sensor fusion system architecture having uni-modal sensors (e.g., cameras) each having a separate, but overlapping, field of view. Edge sensors 520 perform preprocessing and feature extraction and the extracted features from each sensor module are transported over network 525 to central compute server 530. The central compute server performs composite blending of the three separate, overlapping fields of view feature maps to generate a wide field of view feature map. The wide field of view feature map is then passed on to the fusion modules for semantic segmentation or bounding box regression and classification.

Figure 5C:
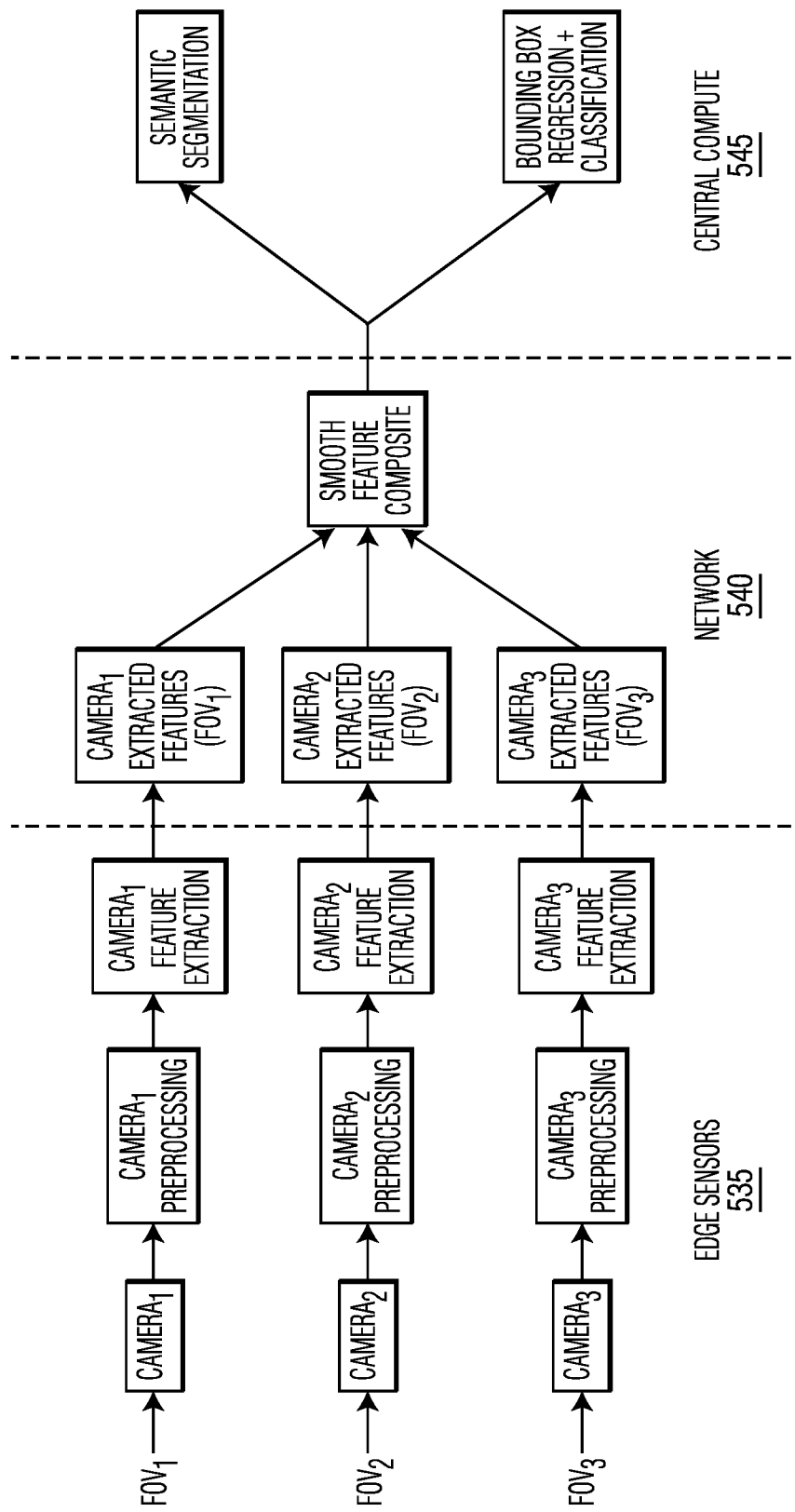

FIG. 5C illustrates a sensor fusion system architecture having a similar uni-modal set of sensors as those illustrated in FIG. 5B. As with FIG. 5B, edge sensors 535 perform preprocessing and feature extraction. In this system architecture, additional processing is performed at a gateway node within network 540. The composite blending is of the separate extracted fields of view is performed at the gateway node. The wide field of view feature map is then transported through the network to central compute server 545 for further fusion processing. Due to the overlap between the adjacent fields of view, the composite wide field of view feature map is typically smaller than the three separate feature maps and thus the amount of data transported across the network is further reduced. In addition, due to the computing processors on a networking device being optimized for low latency, the overall latency of the architecture is not increased. Indeed, due to the reduction of raw data to extracted features, and further, the extracted data being trimmed and combined, the time needed to transport the data in the network is reduced and the overall latency is also reduced.

Figure 5D:
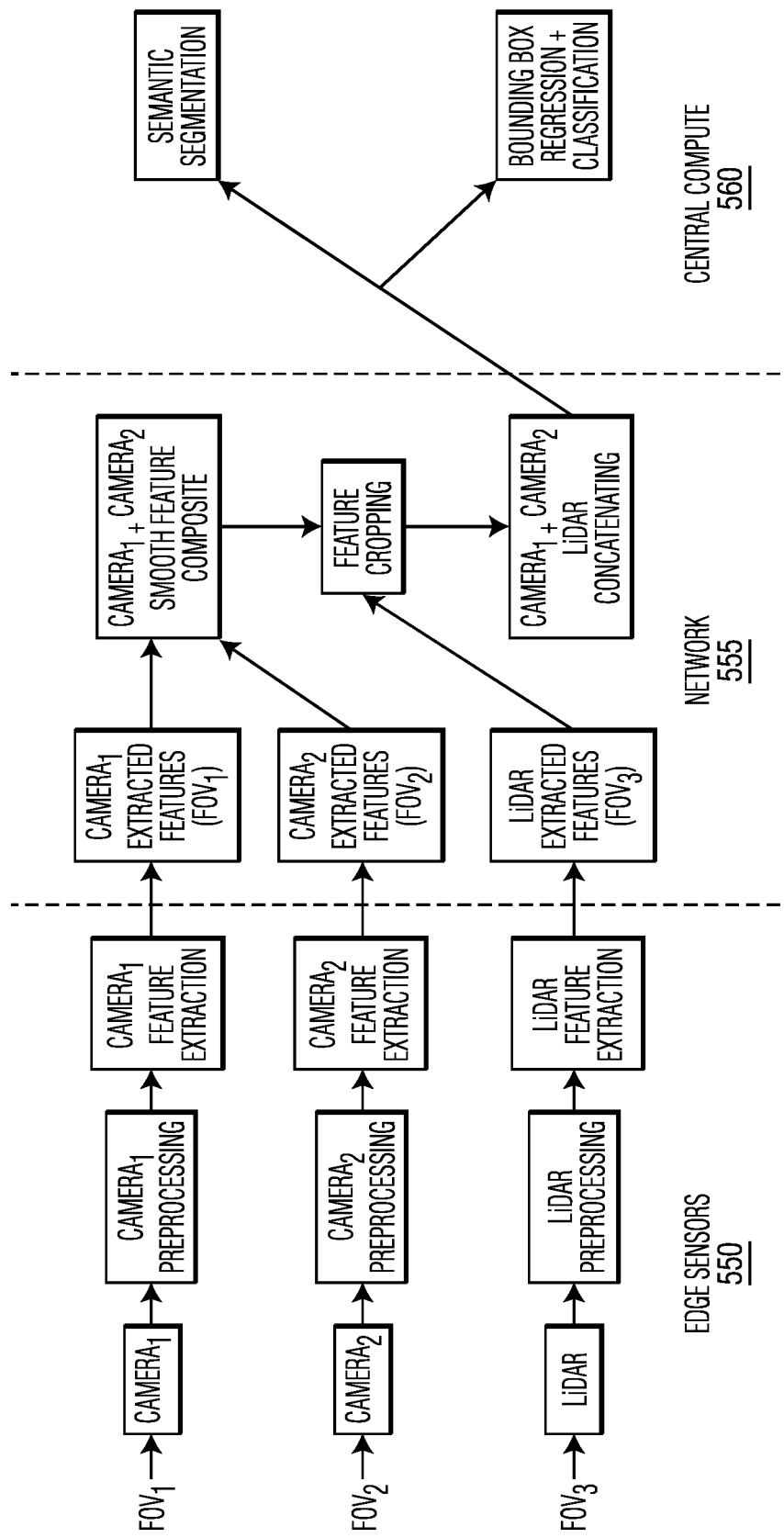

FIG. 5D illustrates a hybrid fusion architecture with a subset of sensors 550 having the same modality (e.g., camera 1 and camera 2) having overlapping fields of view (FOV1 and FOV2), and a sensor having a different modality (e.g., LiDAR) and field of view. In practice, a scanning LiDAR generally has a larger field of view than a single camera. By combining the fields of view of multiple cameras, the composite can be concatenated with projected LiDAR features and passed on to the central compute for fusion processing. As with FIG. 5C, additional edge processing is performed at a gateway node within network 555. Smooth feature composite blending of the separate extracted fields of view of the cameras is performed. The feature maps of the camera composite feature map and the LiDAR feature map can be cropped to conform to the same boundaries, and then the camera composite feature map and the LiDAR feature map can be concatenated. The concatenated feature map is then transported through network 555 to central compute server 560 for further fusion processing.

FIGS. 5A-5D illustrate examples of how various portions of the sensor fusion processing can be distributed between the edge sensor and network gateway nodes prior to the data arriving at a central compute server for processing. As discussed above, the feature extraction process can take the form of convolution and downsampling layers (e.g., pooling layer) of a convolutional neural network. This is a stage at which a feature map of images captured by the sensors is generated and then reduced in size through the downsampling process. The central compute server can then perform the fully connected portions of the CNN, including segmentation and classification tasks. Once classified, additional processing can determine how the vehicle should react.

Figure 6:
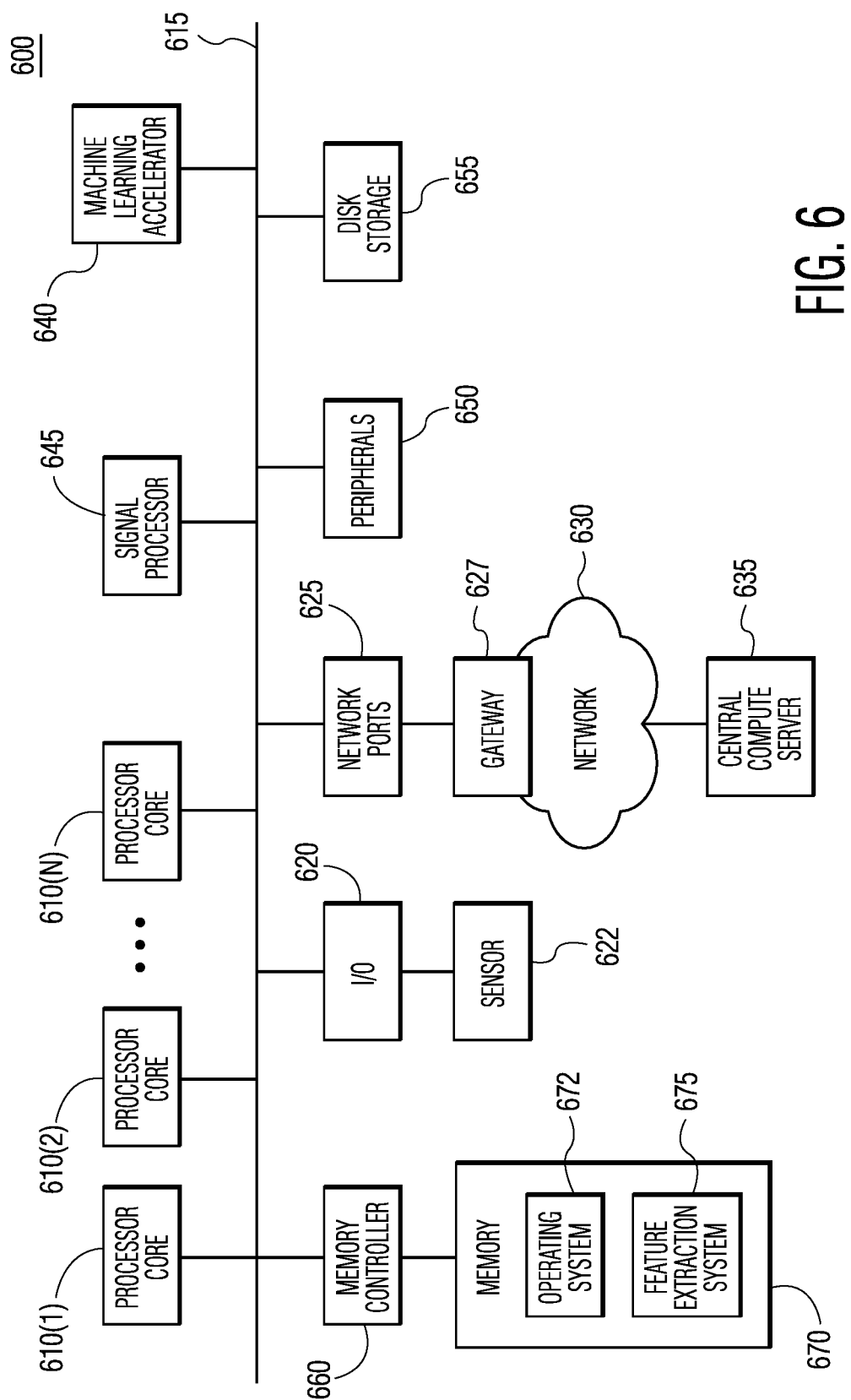
FIG. 6 is a simplified block diagram illustrating an example of a multi-core applications processor incorporating hardware that can be used to implement the system and method of the present media presentation system.

FIG. 6 is a simplified block diagram illustrating an example of a multi-core applications processor 600 incorporating hardware that can be used to implement the system and method of the present sensor system. A system interconnect 615 communicatively couples all illustrated components of the multi-core applications processor. A set of processor cores 610(1)-(N) are coupled to system interconnect 615. Each processor core includes at least one CPU and local cache memory. Further coupled to the system interconnect are input/output devices 620, including sensor devices 622 (e.g., a camera, radar, or LiDAR sensor), along with other associated controllers. The applications processor also includes a network port 625 operable to connect to a network 630, via a gateway node 627. The network is likewise accessible to central compute server 635. The central compute server can provide deep learning data sets for the portions of the present system that utilize artificial intelligence/machine learning operations, as discussed above.

A machine learning accelerator 640 is also communicatively coupled to processor cores 910, along with a signal processor 645. Machine learning accelerator 940 is circuitry dedicated to performing machine learning tasks associated with feature extraction, as discussed above, including, for example, the convolution and pooling layers of a convolutional neural network. Through the system interconnect, any of the processor cores can provide instructions to the machine learning accelerator. Similarly, the signal processor can communicate with the processor cores, the machine learning accelerator, and the I/O devices and is configured to process image/radar/LiDAR signals from the sensors depending upon the application.

In addition to the machine learning accelerator and signal processor, other peripherals or peripheral controllers 650 and disk storage or disk controllers 655 are communicatively coupled to system interconnect 615. Peripherals 650 can include, for example, circuitry to perform power management, flash management, interconnect management, USB, and other PHY type tasks.

Applications processor 600 further includes a system memory 670, which is interconnected to the foregoing by system interconnect 615 via a memory controller 660. System memory 970 further comprises an operating system 672 and in various embodiments also comprises feature extraction system 675. Feature extraction system 675 performs the tasks described above with regard to preprocessing and generating a feature map from data provided by sensor 622 associated with the applications processor.

FIG. 6 is an example of an edge sensor applications processor. Other examples can provide the circuitry to perform the feature extraction in a separate SoC or ASIC from the sensor applications processor. In either case, feature extraction filters are precomputed and stored in memory accessible to the feature extraction circuitry (e.g., memory 670 or a memory directly coupled to the feature extraction circuitry).

Figure 7:
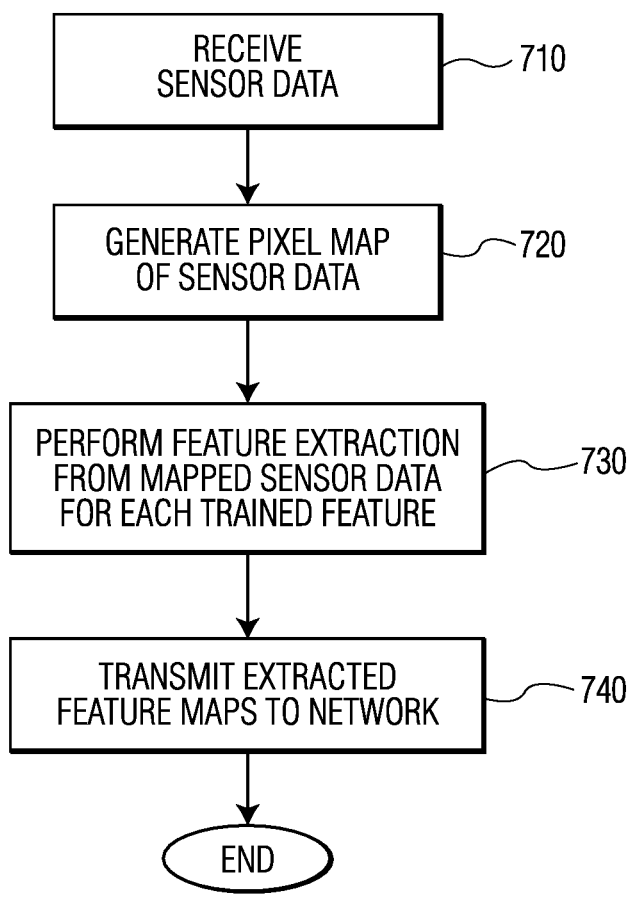
FIG. 7 is a simplified flow diagram illustrating an example of a feature extraction process executed by an edge sensor, in accord with embodiments of the present invention.

FIG. 7 is a simplified flow diagram 700 illustrating an example of a feature extraction process executed by an edge sensor, in accord with embodiments of the present invention. The edge sensor receives sensor data from the associated sensor (710). As discussed above, the associated sensor can be one of a variety of sensors appropriate to the application (e.g., a camera, LiDAR, radar, and the like). The sensor data is then preprocessed to generate a pixel mapping appropriate to the sensor type (e.g., projected radar/LiDAR point cloud or voxelized radar/LiDAR detections by the signal processor) (720).

Feature extraction is performed on the pixelized mapping of the sensor data (730). In a convolutional neural network, such feature extraction includes the convolution layer in which stored filters are compared against the mapped sensor data by generating a dot product of image section values and filter values. The stored filter in the convolution layers are pretrained offline with a labeled data set and are designed to work simultaneously with multiple neural nets located on the central compute server. A feature map is generated by performing multiple filter passes on a pixel map along with downsampling to reduce the size of the feature map (e.g., max pooling in which only maximum values of the smaller map regions are retained).

Once the feature extraction has been performed, the extracted feature maps can be transmitted to a network coupled to the edge sensor (740). As discussed above, the extracted feature map may be transmitted to a central compute server or additional computation on the extracted feature map may be performed at, for example, a gateway node to the network. In some embodiments, multiple network nodes between the edge sensor and the central compute server can perform computation on extracted feature map prior to sending the information to the central compute server. The stored filters in the convolutional layer are trained offline to reuse the same features for multiple applications using transfer learning.

By now it should be appreciated that there has been provided a sensor device that includes a sensor configured to generate sensor data, a feature extraction processor coupled to the sensor, and a processor coupled to the sensor and the feature extraction processor. The feature extraction processor is configured to determine whether one or more features are present in the sensor data, and provide information regarding the features present in the sensor data to the processor. The processor is configured to transmit the information regarding the features present in the sensor data to a network coupled to the sensor device.

In one aspect of the above embodiment the feature extraction processor performs the determining of whether one or more features are present in the sensor data by being further configured to perform a convolution layer analysis of the sensor data, perform a downsampling layer analysis of the sensor data, and perform an activation layer analysis of a feature map generated by the convolution and downsampling layers. The convolution layer, activation layer, and downsampling layer analyses are part of a convolutional neural network analysis performed by a system including the sensor device. In a further aspect, the sensor device further includes a memory coupled to the feature extraction processor and storing one or more filter matrices used for performing the convolution layer analysis. In yet another aspect, the sensor includes one or more of a camera, a radar, and a lidar.

In another aspect of the above embodiment, the network includes a gateway node coupled to the sensor device, where the gateway node is configured to combine the feature information transmitted from the sensor device with feature information received at the gateway node from one or more other sensor devices. In another aspect of the above embodiment, the network includes a central compute server configured to receive the feature information from the sensor device and classify the feature information. In a further aspect the central compute server is configured to classify the feature information by being further configured to perform one of analyze the feature information using fully connected layers of a convolutional neural network and analyze the feature information using deconvolutional layers of the convolutional neural network.

Another embodiment of the present invention provides an automotive sensor system that includes a network, a sensor device coupled to the network, and a central compute server coupled to the network. The sensor device is configured to generate sensor data, determine whether one or more features are present in the sensor data, and transmit information regarding the features present in the sensor data. The central compute server is configured to receive the information regarding the features present in the sensor data, and classify the features present in the sensor data.

In one aspect of the above embodiment the sensor device performs the determining of whether one or more features are present in the sensor data by being further configured to: perform a convolution layer analysis the sensor data; perform a downsampling layer analysis of the sensor data; and perform an activation layer analysis of a feature map generated by the convolution and downsampling layers. The convolution layer, activation layer, and downsampling layer analyses are part of a convolutional neural network analysis performed by the automotive sensor system. In a further aspect, the one or more convolution layer analyses of the sensor data are performed using one or more filter matrices stored in a memory included in the sensor device. In another aspect of the above embodiment, the sensor device includes one or more of a camera, a radar, and a lidar.

In another aspect of the above embodiment, the central compute server performs classifying the features by being further configured to execute one of a fully connected layer of a convolutional neural network or a deconvolutional layer of the convolutional neural network. In a further aspect, determining whether one or more features are present in the sensor data includes executing a convolutional layer of the convolutional neural network. In another aspect of the above embodiment, the automotive sensor system further includes a plurality of other sensor devices coupled to the network and a gateway node coupled to the network, the sensor device, and a set of the plurality of other sensor devices. The gateway node is configured to receive the information regarding the features present in the sensor data, and combine the information transmitted from the sensor device with feature information received at the gateway node from the set of the plurality of other sensor devices.

Another embodiment provides a method for analyzing automotive sensor data. The method includes collecting, by a sensor device, sensor data associated with an environment around an automobile, generating extracted feature maps by the sensor device from the sensor data, and transmitting the extracted feature maps to a remote node on a network.

In one aspect of the above embodiment, the sensor data includes one of radar, lidar, and camera data. In another aspect of the above embodiment, generating the extracted feature maps further includes: executing by the sensor device a convolution layer analysis of the sensor data; executing by the sensor device a downsampling layer analysis of the sensor data; and executing by the sensor device and activation layer analysis of a feature map generated by the convolution and downsampling layer analyses. The convolution layer analysis, activation layer analysis, and the downsampling layer analyses are associated with a convolutional neural network analysis of the sensor data. In a further aspect, the method further includes executing by the remote node one of a fully connected layer analysis or a deconvolutional layer analysis of the extracted feature maps. The fully connected layer analysis or the deconvolutional layer analysis is associated with the convolutional neural network analysis. In another further aspect, executing the convolution layer analysis of the sensor data includes performing the convolution a layer analysis using one or more filters stored in a memory included in the sensor device.

In another aspect of the above embodiment, the method further includes combining by the remote node the extracted feature maps from the sensor device with one or more feature maps generated by associated other sensor devices. The remote node includes a gateway node of the network. The gateway node is coupled to the sensor device and the associated other sensor devices.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 6 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 600 are circuitry located on a single integrated circuit or within a same device. Alternatively, system 600 may include separate integrated circuits or separate devices interconnected with each other. For example, machine learning accelerator 640 may be located on a same integrated circuit as processor cores 610 or on a separate integrated circuit. Peripherals 650 and I/O circuitry 620 may also be located on separate integrated circuits or devices. Also for example, system 600 or portions thereof may be soft or code representations of physical circuitry or of logical representations convertible into physical circuitry.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 600, for example, from computer readable media such as memory 670 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A sensor device comprising:
   a network;
   a sensor configured to generate sensor data and coupled to the network;
   a feature extraction processor, coupled to the sensor, and configured to
      generate extracted features from the sensor data by being configured to:
         perform a convolution layer analysis of the sensor data;
         perform a downsampling layer analysis of the sensor data; and
         perform activation analysis of a map generated by the convolution and downsampling layers, wherein the convolution layer, activation layer, and downsampling layer analyses are part of a convolutional neural network analysis performed by the sensor device, and
      provide the extracted features to a processor;
   a feature combiner coupled to the network and configured to combine the extracted features into extracted feature maps;
   the processor coupled to the sensor, the feature extraction processor, and the feature combiner, wherein the processor is configured to transmit the extracted feature maps to a central compute server via the network; and
   the central compute server coupled to the network and configured to make one or more decisions based on the extracted features maps, wherein the central compute server is configured to make the one or more decisions by being configured to execute one of a fully connected layer of a convolutional neural network or a deconvolutional layer of the convolutional neural network.

2. The sensor device of claim 1 further comprising:
   a memory, coupled to the feature extraction processor, and storing one or more filter matrices used for said performing the convolution layer analyses.

3. The sensor device of claim 1 wherein the sensor comprises one or more of a camera, a radar, and a LiDAR.

4. The sensor device of claim 1 wherein the network comprises:
   a gateway node coupled to the sensor device, the gateway node configured to combine the feature information transmitted from the sensor device with feature information received at the gateway node from one or more other sensor devices.

5. The sensor device of claim 1, wherein the central compute server is further configured to analyze the extracted features by being configured to perform at least one of:
   analyze the extracted features using fully connected layers of the convolutional neural network; and
   analyze the extracted features using deconvolutional layers of the convolutional neural network, wherein the central compute server is configured to reuse the extracted features provided by the sensor device for a plurality of applications using transfer learning.

6. An automotive sensor system comprising:
   a network;
   a sensor device, coupled to the network, and configured to
      generate sensor data,
      generate extracted features from the sensor data by being configured to:
         perform a convolution layer analysis of the sensor data;
         perform a downsampling layer analysis of the sensor data; and
         perform an activation layer analysis of a feature map generated by the convolution and downsampling layers, wherein the convolution layer, activation layer, and downsampling layer analyses are part of a convolutional neural network analysis performed by the automotive sensor system, and
      transmit the extracted features; and
   a central compute server, coupled to the network, and configured to
      receive the extracted features from the sensor device via the network,
      combine the extracted features into extracted feature maps,
      execute one of a fully connected layer of a convolutional neural network or a deconvolutional layer of the convolutional neural network, and
      make decisions based on the extracted feature maps.

7. The automotive sensor system of claim 6 wherein the convolution layer analysis of the sensor data is performed using one or more filter matrices stored in a memory comprised in the sensor device.

8. The automotive sensor system of claim 6 wherein the sensor device comprises one or more of a camera, a radar, and a LiDAR.

9. The automotive sensor system of claim 6 further comprising:
   a plurality of other sensor devices coupled to the network; and
   a gateway node coupled to the network, the sensor device, and a set of the plurality of other sensor devices, the gateway node configured to
      receive the extracted features in the sensor data, and
      combine the extracted features transmitted from the sensor device with extracted features received at the gateway node from the set of the plurality of other sensor devices.

10. A method for analyzing automotive sensor data by an automotive sensor system comprising a network, a plurality of sensor devices coupled to the network, a feature combiner, and a remote node coupled to the network, the method comprising:

collecting, by each sensor device in the plurality of sensor devices, sensor data associated with an environment around an automobile;

generating extracted features, by each sensor device, from the sensor data, wherein generating the extracted features comprises:

executing, by each sensor device, a convolution layer analysis of the sensor data;

executing, by each sensor device, a downsampling layer analysis of the sensor data; and executing, by each sensor device, an activation layer analysis of a feature map generated by the convolution and downsampling layer analyses, wherein the convolution layer analysis, activation layer analysis and the downsampling layer analysis are associated with a convolutional neural network analysis of the sensor data;

transmitting the extracted features to the remote node on the network;

combining, by the feature combiner, the extracted features from one of the plurality of sensor devices with extracted features from other of the plurality of sensor devices; and executing, by a central processing server coupled to the network, one of a fully connected layer analysis or a deconvolutional layer analysis of the extracted feature maps, wherein the fully connected layer analysis or the deconvolutional layer analysis is associated with the convolutional neural network analysis.

11. The method of claim 10 wherein the sensor data comprises one of radar, LiDAR, and camera data.

12. The method of claim 10 wherein said executing the convolutional layer analysis of the sensor data comprises:

performing the convolutional layer analysis using one or more filters stored in a memory comprised in the sensor device.

13. The method of claim 10, wherein, the remote node comprises a gateway node of the network, and the gateway node is couple to the sensor device and the associated other sensor devices.

\* \* \* \* \*